United States Patent [19]

Groenewegen et al.

[11] 4,422,598

[45] Dec. 27, 1983

[54] EXTREME TEMPERATURE TAPE RECORDER DRIVE BELT

[75] Inventors: Johannes B. Groenewegen, Kirkland; Stephen M. Meginniss, III, Seattle, both of Wash.

[73] Assignee: Sundstrand Data Control, Inc., Redmond, Wash.

[21] Appl. No.: 271,764

[22] Filed: Jun. 9, 1981

[51] Int. Cl.³ .......................... G03B 1/04; F16H 55/36
[52] U.S. Cl. ..................... 242/192; 474/237
[58] Field of Search ............... 242/192, 200, 201–210; 474/237–247, 200–205, 264, 268; 428/145, 147, 149, 425.5, 446

[56] References Cited

U.S. PATENT DOCUMENTS 3,692,255  9/1972  Von Behren .................. 242/192
4,012,962  3/1977  Ballou et al. .................. 474/264
4,342,809  8/1982  Newell .................. 428/215

OTHER PUBLICATIONS

General Electric Silicone Rubber SE55634, Product Data.
1979 Annual Book of ASTM Standards, Part 37, pp. 339–341.

Primary Examiner—Leonard D. Christian
Attorney, Agent, or Firm—Ted. E. Killingsworth; Michael B. McMurry; Harold A. Williamson

[57] ABSTRACT

In order to provide a magnetic tape recorder where the magnetic tape and tape reels are driven by a drive belt with the capability of operating in temperature extremes, the drive belt is composed of silicone rubber that has been cured with a peroxide curing agent.

2 Claims, 1 Drawing Figure

EXTREME TEMPERATURE TAPE RECORDER DRIVE BELT

BACKGROUND OF THE INVENTION

The invention relates to the field of drive belts used to drive tape reels in magnetic tape recorders and more particularly to belts for use in tape recorders subject to extreme environmental conditions including low temperatures.

In one particular type of magnetic tape recorder which for example is described in detail in Von Behren U.S. Pat. No. 3,692,255, a belt which contacts the tape on the reels and which is driven by a capstan is used to drive the tape reels. This type of recorder has found wide application in cassette drives used in computer peripheral equipment. In addition, this type of recorder can be used with particular advantages for the accumulation of digital data in military and commercial aircraft.

However, it has been determined that the commercially available drive belts are unsuitable for use in aircraft recorders that are subject to both very high and very low temperatures that typically range from −55° C. to +71° C. The commercially available prior art belts are limited to a temperature range of +5° C. to +45° C. which is inadequate for aircraft recorder applications.

Another disadvantage of the prior art belts also results from the material composition of the belts which effectively limits the ratio of the radius of a full tape reel to the radius of an empty tape reel to a ratio of two to one thereby resulting in an undesirable limitation in the amount of magnetic tape that can be used on reels of a given size.

SUMMARY OF INVENTION

It is therefore an object of the invention to provide a belt for driving tape reels in a magnetic tape recorder that can operate in temperature extremes. It is a further object of the invention to provide a belt for driving tape reels in a magnetic tape recorder wherein the belt is composed substantially of silicone rubber. The silicone rubber is composed of a silicone polymer chain having methyl, phenyl and vinyl substituent groups and is cured with a peroxide curing agent.

DETAILED DESCRIPTION OF THE INVENTION

Figure 1:
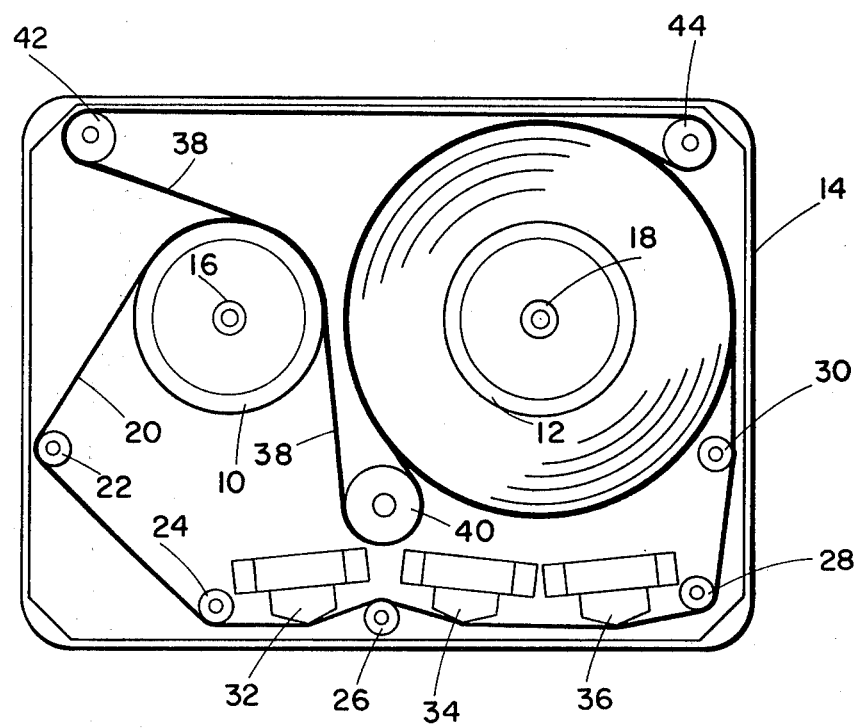
FIG. 1 is a top view of a magnetic tape recorder.

Illustrated in FIG. 1 is an example of a magnetic tape recorder using a belt to drive tape reels of the type disclosed in detail in Von Behren U.S. Pat. No. 3,692,255. As shown in FIG. 1, a pair of tape reels 10 and 12 are rotatably mounted on a mounting base plate 14 by a pair of hubs 16 and 18. A magnetic recording tape 20 is wound on the reels 10 and 12 and passes over tape guides 22, 24, 26, 28 and 30 which serve to guide the tape across magnetic recording heads 32, 34 and 36.

In order to cause the reels to rotate and the magnetic tape 20 to pass across the recording heads 32, 34 and 36, a drive belt 38 is wound around a power driven capstan 40 and belt guide roller 42 and 44 such that the belt 38 abuts a portion of the tape 20 wound on the reels 10 and 12. Since the drive belt 38 is frictionally engaged with a portion of the magnetic tape 20 on the reels 10 and 12, rotation of the capstan 40 will result in the drive belt moving with respect to the reels 10 and 12 causing the tape 20 to wind off one reel and on to the other and to move across the recording heads 32, 34 and 36.

The preferred material for the drive belt 38 is silicone rubber and in the preferred embodiment is composed of a silicone rubber having methyl, phenyl and vinyl substituent groups of the polymer chain. This material is described in the 1979 Annual Book of ASTM Standards, part 37, published by the American Society for Testing and Materials and is commercially available from General Electric Company as silicone rubber SE5563U. The basic silicone rubber material is preferrably cured by a peroxide curing agent such as Bis (2, 4 Dichlorobenzoyl) Peroxide, which is commercially available as the trademarked products Cadox TS-50 or Luperco CST of the Noury Chemical Corporation and the Pennwalt Corporation respectively.

In the curing cycle a curing agent level of 1.6% by weight is used and the rubber is press cured for ten minutes at a temperature of +125° C. The post cure process should take place for four hours at a temperature of +205° C.

A drive belt 38 composed of the above described material can operate satisfactorily in a tape recorder of the type shown in FIG. 1 over a temperature range of −55° C. to +71° C. Additionally a drive belt 38 composed of this material permits a full to empty reel radius ratio of over two to one.

We claim:

1. A drive belt for abuting and driving magnetic tape and tape reels in a magnetic tape recorder comprising: a silicone rubber including a silicone polymer chain; and substituent groups on the polymer chain.

2. The drive belt of claim 1 wherein said substituent groups include methyl, phenyl and vinyl.

* * * * *